(12) United States Patent
Abd Elhamid et al.

(10) Patent No.: US 8,182,963 B2
(45) Date of Patent: May 22, 2012

(54) LOW-COST MANGANESE-STABILIZED AUSTENITIC STAINLESS STEEL ALLOYS, BIPOLAR PLATES COMPRISING THE ALLOYS, AND FUEL CELL SYSTEMS COMPRISING THE BIPOLAR PLATES

(75) Inventors: Mahmoud H. Abd Elhamid, Grosse Pointe Woods, MI (US); Arianna T. Morales, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 314 days.

(21) Appl. No.: 12/500,886

(22) Filed: Jul. 10, 2009

(65) Prior Publication Data

US 2011/0008714 A1   Jan. 13, 2011

(51) Int. Cl.
  *H01M 2/00* (2006.01)
  *C22C 38/58* (2006.01)
  *C22C 38/18* (2006.01)
  *B05D 5/12* (2006.01)

(52) U.S. Cl. ............. 429/518; 420/59; 420/65; 427/115

(58) Field of Classification Search .................. 429/518; 420/59, 65; 427/115
See application file for complete search history.

(56) References Cited

U.S. PATENT DOCUMENTS

| | | | |
|---|---|---|---|
| 4,568,387 A | 2/1986 | Ziemianski | |
| 4,946,644 A | 8/1990 | Schumacher et al. | |
| 5,286,310 A | 2/1994 | Carinci et al. | |
| 5,308,577 A | 5/1994 | Dulmaine et al. | |
| 5,328,529 A | 7/1994 | Cordea et al. | |
| 6,056,917 A | 5/2000 | Chesseret et al. | |
| 6,274,084 B1 | 8/2001 | Haudrechy | |
| 6,682,582 B1 | 1/2004 | Speidel | |
| 2002/0187379 A1* | 12/2002 | Yasuo et al. | ..................... 429/34 |
| 2004/0025979 A1 | 2/2004 | Bruckner et al. | |

(Continued)

FOREIGN PATENT DOCUMENTS

WO   93/13233   8/1993

(Continued)

OTHER PUBLICATIONS

H. Tawfik et al, "Metal bipolar plates for PEM fuel cell—a review", 2007 (no month, online Nov. 2006), Journal of Power Sources 163, pp. 755-767.*

(Continued)

*Primary Examiner* — Jessee R. Roe
(74) *Attorney, Agent, or Firm* — Dinsmore & Shohl LLP (57) ABSTRACT

Corrosion resistant, manganese-stabilized austenitic stainless steels with a low nickel content are used in bipolar plates, methods for fabricating the bipolar plates, and polymer electrolyte membrane (PEM) fuel cells comprising the bipolar plates. The bipolar plates are formed from high-manganese austenitic stainless steels comprising, in weight percents, 4.0 to 35 manganese, 0.5 to 1.5 nickel, 17 to 20 chromium, 0.2 to 0.5 nitrogen, up to 0.075 carbon, 0.5 to 1.0 silicon, up to 0.1 aluminum, 0 to 0.005 sulfur, and balance iron and incidental impurities. The steels exhibit suitable corrosion resistance, electrical contact resistance, and mechanical properties for high-corrosion applications such as use in bipolar plate materials for PEM fuel cells. The bipolar plates may comprise a solid plate of the steel, optionally coated with a highly electrically conductive material. Alternatively, the bipolar plates may comprise an economical substrate coated with the steel, optionally further coated with a highly electrically conductive material.

3 Claims, 3 Drawing Sheets

U.S. PATENT DOCUMENTS

| | | |
|---|---|---|
| 2006/0093888 A1 | 5/2006 | Vyas et al. |
| 2006/0275168 A1 | 12/2006 | Rakowski et al. |
| 2007/0117003 A1 | 5/2007 | Abd Elhamid et al. |
| 2007/0267107 A1 | 11/2007 | Michler |
| 2008/0035248 A1 | 2/2008 | Cugy et al. |
| 2008/0053580 A1 | 3/2008 | Drillet et al. |
| 2008/0138687 A1* | 6/2008 | Abd Elhamid et al. ......... 429/34 |
| 2008/0199345 A1 | 8/2008 | Scheller et al. |
| 2008/0206088 A1 | 8/2008 | Cusolito et al. |
| 2009/0159602 A1* | 6/2009 | Hatano et al. ................. 220/581 |

FOREIGN PATENT DOCUMENTS

| | | |
|---|---|---|
| WO | 02/101109 | 12/2002 |
| WO | 2007/052773 | 5/2007 |
| WO | WO 2007/052773 A1 * | 5/2007 |
| WO | 2007/075006 | 7/2007 |

OTHER PUBLICATIONS

"New 200-series" steels: An opportunity or a threat to the image of stainless steel?; International Stainless Steel Forum (ISSF); Nov. 2005; pp. 1-11; Internet: www.worldstainless.org.

* cited by examiner

LOW-COST MANGANESE-STABILIZED AUSTENITIC STAINLESS STEEL ALLOYS, BIPOLAR PLATES COMPRISING THE ALLOYS, AND FUEL CELL SYSTEMS COMPRISING THE BIPOLAR PLATES

BACKGROUND OF THE INVENTION

The present invention relates to manganese-stabilized, austenitic stainless steel alloys suitable for use as bipolar plate materials for polymer electrolyte membrane (PEM) fuel cells, to bipolar plates comprising the alloys, and to PEM fuel cells comprising the bipolar plates.

PEM fuel cell assemblies frequently are constructed as stacks of multiple fuel cells. The individual fuel cells in the stacks each are separated by a flow field plate, of which one side functions as the anode for one fuel cell while the opposite side functions as the cathode for an adjacent fuel cell. Such a flow field plate, therefore, is commonly known as a bipolar plate.

Bipolar plates for PEM fuel cells must be electrochemically stable in an acidic fuel cell environment, must have sound mechanical properties, and must be easy to form into thin devices that have distribution channels on both sides of the plate. In addition, they must have a minimum contact resistance with the gas diffusion medium that is used to distribute the reactive gases to the catalyst layers inside the fuel cell. Minimum contact resistance typically is accomplished by choosing materials with high resistance to corrosion and low conduciveness to formation of passive layers. Importantly, bipolar plates must be cost effective so as to allow for mass commercialization of PEM fuel cells.

Metallic alloys in general and austenitic stainless steels in particular are considered potential material candidates for bipolar plates. Compared with bipolar plates comprising materials such as carbon composites, bipolar plates comprising alloys such as austenitic stainless steels offer advantages including decreased weight and increased volumetric power density. However, the cost of high-nickel austenitic stainless steels has increased considerably during the last few years, in part because of unprecedented demand for low cost stainless steels for commercial use in emerging markets such as India and China. Accordingly, there is a need to replace the expensive nickel component partially or completely in austenitic stainless steels to reduce cost and to allow for mass commercialization into PEM fuel cells.

Nickel is added to stainless steels to stabilize the austenite phase. If nickel is reduced or replaced in an austenitic stainless steel, other austenite stabilizers must be added to stabilize the austenitic structure. Carbon, copper, nitrogen, manganese, and cobalt are austenite stabilizers also, but the proportion of each added must be chosen with care. For example, carbon added as an austenite stabilizer can cause depletion of chromium around grain boundaries and thereby can sensitize the alloy to corrosion. Addition of copper under such circumstances can mitigate the sensitization to corrosion, but copper too is a relatively expensive metal. Manganese, on the other hand, is less expensive but is about half as effective as nickel for stabilizing the austenitic phase. As such, about twice the weight of manganese typically would be required in place of a given weight of nickel unless another austenite stabilizer such as nitrogen or copper were present.

Manganese austenitic stainless steels are known in the art. Standard grades of manganese austenitic stainless steels belong to the "200-series" alloys classified by the American Iron and Steel Institute (AISI). Alloys belonging to this series typically may contain low amounts of nickel. However, to retain an austenitic structure in steels with manganese substituted in the place of nickel, a corresponding reduction of chromium generally is necessary. For example, decreasing nickel content in an austenitic stainless steel from 12 wt. % to 1 wt. % may require reducing chromium content from 18 wt. % to about 15 wt. % to maintain an austenitic structure if manganese replaces a substantial amount of the nickel and all other components of the steel are kept the same. Because chromium is useful in promoting corrosion resistance in stainless steels of all varieties, it follows that the benefit of using less nickel can be outweighed by the detriment to corrosion resistance from having less chromium.

When manganese is added to an iron-chromium system such as a stainless steel, the solid and liquid solubility of nitrogen increases sufficiently to allow nitrogen to act as an effective austenite stabilizer. For example, when starting with an alloy such as 316 stainless steel with 18% chromium, and eliminating the 12% nickel that is normally present, roughly 12% manganese and 0.5% nitrogen will be sufficient to stabilize the austenite in place of the nickel without a corresponding need to reduce the amount of chromium. However, depending on the casting method for the alloy composition, excess nitrogen can cause formation of various iron or chromium nitride passive layers that are disadvantageous to contact resistance of the final alloy composition. Therefore, it is important to select a nitrogen content high enough to permit stabilization of the austenitic phase yet low enough to avoid undesirable propagation of nitride passive layers.

Examples of alternative austenitic stainless steels that have less Ni but rather appreciable quantities of other austenite stabilizers are 201 from Allegheny Ludlum (5.50-7.50 wt. % manganese and 3.50-5.50 wt. % nickel), Nitronic 30 from AK Steel (7.0-9.0 wt. % manganese and 1.5-3.0 wt. % nickel), and 204-Cu from Carpenter Technology (6.50-9.00 wt. % manganese, 2.00-4.00 wt. % copper, and 1.50-3.50 wt. % nickel). However, the uses of these steels have been limited to applications that require high strength but only moderate corrosion resistance. Moreover, the production of these alloys has not been scaled up to the same magnitude as nickel-based austenitic stainless steels, owing to low demand or to technical problems frequently encountered during production. Manganese-rich alloys are generally undesirable for use in highly corrosive environments, because even small amounts of sulfur present in the alloys can combine with manganese to form manganese sulfides that are known to function as active sites for corrosion.

A significant reduction in the material cost of stainless steel bipolar plates for PEM fuel cells is possible from the replacement of nickel with manganese as an austenitic stabilizer. Therefore, there is a need for low-cost, manganese-stabilized austenitic stainless steel alloys that can perform well in high-corrosion environments.

BRIEF SUMMARY OF THE INVENTION

This need is met through the several embodiments of the present invention. In accordance with a first embodiment of the present invention, a bipolar plate is provided. The bipolar plate comprises a cathode face and an anode face. The cathode face may define at least one first flow distribution channel for at least one first reactant. The anode face may define at least one second flow distribution channel for at least one second reactant. At least one of the cathode face and the anode face of the bipolar plate may comprise an austenitic stainless steel alloy comprising, in weight percent based on the total weight of the alloy, 4-35% manganese, 0.5-1.5% nickel, 17-20% chromium, 0.2-0.5% nitrogen, 0.5-1.0% silicon, up to 0.1% aluminum, less than 0.075% carbon, less than 0.005% sulfur, minimal incidental impurities such as phosphorus, and a balance of iron.

Optionally, the alloy may comprise 9.0-25 wt. % manganese. Optionally, the alloy may comprise 14-25 wt. % manganese. Optionally, the alloy may comprise 19-25 wt. % manganese. Optionally, the alloy may comprise 21 wt. % manganese and may comprise 0.05-0.06 wt. % carbon, about 18 wt. % chromium, about 1.0 wt. % nickel, about 0.6 wt. % silicon, and 0.3-0.4 wt. % nitrogen. Optionally, the alloy may further comprise up to 5.0 wt. % copper.

The bipolar plate may comprise further a thin layer of highly electrically conductive metal, which may comprise gold, platinum, iridium, ruthenium, rhodium, or alloys comprising one or more of such metals. The thin layer may have a thickness of approximately 2-50 nm.

Optionally, the austenitic stainless steel alloy may be disposed on a substrate as a thin layer. The substrate may comprise a material such as a lower grade austenitic stainless steel, a ferritic stainless steel, a carbon steel, or aluminum. In such an arrangement, the thin layer of austenitic stainless steel optionally may be coated with a thin layer of a highly electrically conductive metal such as gold, platinum, iridium, ruthenium, rhodium, or alloys comprising one or more of such metals. The thin layer may have a thickness of approximately 2-50 nm.

In accordance with another embodiment of the present invention, a method is provided for fabricating a bipolar plate. In such a method, a manganese-stabilized austenitic stainless steel alloy is provided. The alloy may comprise, in weight percent based on the total weight of the alloy, 4-35% manganese, 0.5-1.5% nickel, 17-20% chromium, 0.2-0.5% nitrogen, 0.5-1.0% silicon, up to 0.1% aluminum, less than 0.075% carbon, less than 0.005% sulfur, minimal incidental impurities such as phosphorus, and a balance of iron.

Optionally, the alloy may be subjected to a refinement step such as a thermal treatment. The thermal treatment may comprise solution annealing. The alloy then is worked into a thin plate structure. Thereupon, features such as flow distribution channels are formed into the thin plate structure to result in a workpiece suitable for use as a bipolar plate. Optionally, the workpiece is coated with a highly electrically conductive metal layer, which may comprise gold, platinum, iridium, ruthenium, rhodium, or alloys of any of such metals.

In another embodiment of the present invention, a fuel cell system is provided. The fuel cell system comprises a proton exchange membrane having a first face and a second face, a cathode catalyst layer overlying the first face of the proton membrane, a cathode diffusion layer coupled to the cathode catalyst layer, a cathode overlying the cathode diffusion layer, an anode catalyst layer overlying the second face of the proton exchange membrane, an anode diffusion layer coupled to the anode catalyst layer, and an anode overlying the anode diffusion layer. The cathode comprises a first flowpath for a first reactant. The anode comprises a second flowpath for a second reactant. At least one of the flowpaths are formed in a bipolar plate according to any of the other embodiments of the present invention.

In accordance with another embodiment of the present invention, a method for fabricating a bipolar plate comprises providing a substrate and forming the substrate into a thin plate structure. Flow distribution channels are formed on the plate.

The substrate may comprise a material such as an austenitic stainless steel, a graphitic stainless steel, or a carbon composite.

During or after the forming of the plate, a thin layer of manganese-stabilized austenitic stainless steel alloy is applied. The alloy may comprise, in weight percent based on the total weight of the alloy, 4-35% manganese, 0.5-1.5% nickel, 17-20% chromium, 0.2-0.5% nitrogen, 0.5-1.0% silicon, up to 0.1% aluminum, less than 0.075% carbon, less than 0.005% sulfur, minimal incidental impurities such as phosphorus, and a balance of iron. The thin layer of manganese-stabilized austenitic stainless steel alloy may have a thickness of approximately 0.1-20 μm.

Optionally, the manganese-stabilized stainless steel alloy may be applied by a technique such as arc melting, physical vapor deposition, or ion beam deposition.

Optionally, an additional thin layer, comprising a highly electrically conductive metal such as gold, platinum, iridium, ruthenium, rhodium, or alloys comprising any of such metals, may be applied to the surface of the stainless steel layer. The thin layer may have a thickness of approximately 2-50 nm.

In accordance with one embodiment of the present invention, austenitic stainless steel alloys are provided, wherein a significant amount of manganese is present as the stabilizing element for the austenitic structure. The alloys comprise, in weight percent based on the total weight of the alloy, 4-35% manganese, 0.5-1.5% nickel, 17-20% chromium, 0.2-0.5% nitrogen, 0.5-1.0% silicon, up to 0.1% aluminum, less than 0.075% carbon, less than 0.005% sulfur, minimal incidental impurities such as phosphorus, and a balance of iron. The 4-35 wt. % manganese in the alloys is provided as a low-cost substitute for nickel to stabilize the austenitic structure. Chromium content is maintained at about 18 wt. % to foster high corrosion resistance. The carbon content of the alloys is kept low intentionally, preferably below 0.075 wt. %, to avoid formation of carbide precipitates that adversely affect ductility. Likewise, the alloys are cast using low-sulfur starting materials to result in very low final sulfur contents, preferably below 0.005 wt. % sulfur. The alloys exhibit sound mechanical properties, easy formability and workability, electrochemical stability in acidic environments, and minimal contact resistance in a gas diffusion medium. As such, the alloys are particularly well suited for use in highly corrosive environments such as those commonly present within PEM fuel cells.

In further embodiments, the alloys may comprise 9.0-25 wt. % manganese, 14-25 wt. %, or 19-25 wt. % manganese. In another embodiment, the alloys may comprise 21 wt. % manganese and may comprise further 0.05-0.06 wt. % carbon, about 18 wt. % chromium, about 1.0 wt. % nickel, about 0.6 wt. % silicon, and 0.3-0.4 wt. % nitrogen. Optionally, the alloys may further comprise up to 5.0 wt. % copper.

BRIEF DESCRIPTION OF THE DRAWINGS

The following detailed description of specific embodiments of the present invention can be best understood when read in conjunction with the following drawings, wherein bipolar plates made according to various aspects of the present invention as part of a fuel cell assembly are shown.

DETAILED DESCRIPTION

The compositions of the alloys of the present invention are selected to provide corrosion resistant, electrochemically stable stainless steels alloys having an austenitic structure and a low nickel content. These characteristics are met by lowering the amount of nickel and instead using manganese and nitrogen to stabilize the austenitic structure. Generally, the alloys comprise, in weight percents based on the total weight of the alloy, 4-35% manganese, 0.5-1.5% nickel, 17-20% chromium, 0.2-0.5% nitrogen, 0.5-1.0% silicon, up to 0.1% aluminum, less than 0.075% carbon, less than 0.005% sulfur, minimal incidental impurities such as phosphorus, and a balance of iron. Specific non-limiting alloy compositions of the present invention, as described in the Examples, are characterized by desirable corrosion resistance and electrochemical stability with a low nickel content of approximately 1%.

These alloys are suitable for use in a variety of applications that involve exposure to highly corrosive environments. Though the use of the alloys as bipolar plates in the corrosive environment of PEM fuel cells is specifically contemplated in the embodiments of the present invention, it is further contemplated that the alloys also may be useful in other applications as replacements for high-nickel content stainless steels. Such applications include, but are not limited to, structural building materials; automobile components; gas turbine components; chemical reactor components; marine applications such as boat hulls, buoys, dock structures, or desalination apparatus; airplane components; aerospace vehicle components; outdoor decorative structures; pipes and fittings; and biomedical or dental implants.

High corrosion resistance is a paramount consideration to the use of austenitic stainless steel alloys in fuel cells, wherein highly corrosive gases such as hydrogen are present at high temperatures and pressures. For this reason, the alloys of the present invention contain about 18 wt. % chromium. Maintenance of both a high chromium content and an austenitic structure is achieved through selecting the amounts of carbon and nitrogen to add as additional austenite stabilizers within the alloys.

In the alloys of the present invention, carbon content is kept intentionally low, preferably below 0.075 wt. %. Despite the ability of carbon to stabilize the austenitic phase, the presence of carbon can affect corrosion resistance adversely through formation of carbide phases. Particularly, chromium can be depleted from grain boundaries on alloy surfaces when chromium carbide phases form. The depletion of chromium from grain boundaries in turn decreases corrosion resistance of the alloy.

In the alloys of the present invention, nitrogen content is intentionally chosen to be relatively high, preferably in the range of 0.2-0.5 wt. %. Because nitrogen itself stabilizes the austenitic phase, addition of nitrogen permits a higher chromium content of about 18 wt. % in the austenitic stainless steel alloys of the present invention. Nitrogen imparts an added benefit of higher strength to the alloys. However, high nitrogen content also can give rise to formation of nitride phases such as iron nitride, which can reduce the corrosion resistance of the formed alloys considerably. Moreover, nitrides can appear as passive layers on the alloy surface and can reduce contact resistance on the steel surface for applications requiring low contact resistance. Susceptibility of alloy compositions to nitride formation is dependent largely on casting method. Therefore, care must be taken in the choice of casting method to control the process of nitride formation in the alloys. For example, nitrogen may be added to the alloy in a furnace charge comprising nitrided FeCr.

In the alloys of the present invention, sulfur content is intentionally kept as low as possible, preferably below 0.0050 wt. % (50 ppm). Sulfur has an affinity toward combining with manganese to form manganese sulfides, and manganese sulfides are known to function as active sites for pitting corrosion in steels. The sulfur content of the alloys is directly related to the sulfur content in the starting materials used to produce the alloys. As such, starting materials must be selected with extreme care to avoid introduction of sulfur into the alloys. Generally, the effects of even slight sulfur contamination on corrosion resistance in high-manganese austenitic steels have hindered pursuits toward developing the use of the manganese steels in extremely corrosive environments such as those within a fuel cell or marine environments. The alloys of the present invention avoid this problem in that they comprise a very low sulfur content.

As a result of careful selection of alloy components, the alloys of the present invention exhibit very high corrosion resistance. The corrosion resistance of the alloys of the present invention surpass that of alloys such as 304L stainless steel, an alloy containing up to 10 wt. % nickel and used in the prior art as a bipolar plate for PEM fuel cells.

The manganese-stabilized austenitic stainless steel alloys made according to the embodiments of the present invention exhibit electrochemical stability and low electrical contact resistance. Low electrical contact resistance is necessary for use of the manganese austenitic stainless steels of the present invention in applications such as bipolar plates for PEM fuel cells. Bipolar plates function both as anodes and cathodes in electrochemical reactions used to produce energy from fuels such as hydrogen and oxygen. As such, constant electrical continuity is required through the bipolar plate between the fuel medium and an external circuit that transports electrons and provides power.

To an extent, electrical contact resistance can increase as corrosion resistance increases. One factor contributing to high corrosion resistance in alloys comprises the formation of a passive layer such as a nitride or an oxide on the surface of the alloy. The passive layers naturally are less electrically conductive than bare metal. The manganese-stabilized austenitic stainless steels of the present invention may exhibit passive layers, most commonly comprising complex oxides such as $(Fe,Si)O$ and $(Fe,Si,Cr,Mn)O$. Under controlled experimental conditions designed to grow passive layers on the alloys of the present invention, the thickness of the passive layers was observed to increase with increasing manganese content of the alloys. Contact resistance of the alloys increases with increasing passive layer thickness. Nevertheless, the passive electric currents measured across passive layers formed on the alloys of the present invention were shown to be comparable to those measured on 304L stainless steel subjected to identical passive film growth conditions.

The manganese-stabilized austenitic stainless steel alloys of the present invention exhibit ductility suitable for uses such as bipolar plates for PEM fuel cells. It is desirable in the art of bipolar plate manufacturing to use plates comprising materials having percent elongation values (one measure of ductility) of at least 31-39%, and preferably greater than 40%. This level of ductility makes feasible the formation of a larger variety of nested designs and flowpath patterns within a bipolar plate that may be employed as part of a stacked arrangement in a fuel cell system.

As cast without any post-treatment, the manganese-stabilized austenitic stainless steel alloys of the present invention exhibit elongation values in the range of about 17% to about 30%. To raise elongation values above the 40% threshold and up to 50-60%, a thermal treatment such as a solution anneal may be employed. The thermal treatment causes precipitates such as metal carbides to dissolve into the alloy matrix. Because precipitates typically impede grain boundary dislocation, when the precipitates are eliminated the alloys are strengthened and acquire a higher tolerance to stretching. Alternatively, ductility in the alloys of the present invention may be increased by adding up to 5 wt. % copper to the alloys. However, copper is itself a relatively expensive metal, the addition of which can lessen the economic advantage of using a decreased amount of nickel.

In a method for fabricating a bipolar plate comprising the manganese-stabilized austenitic stainless steel alloys of the present invention, initially a substrate is provided. The substrate may comprise an austenitic stainless steel comprising, in weight percents, 4.0 to 35 manganese; 0.5 to 1.5 nickel; 17 to 20 chromium; 0.2 to 0.5 nitrogen; up to 0.075 carbon; 0.5 to 1.0 silicon; up to 0.1 aluminum; 0 to 0.005 sulfur; and balance iron and incidental impurities. The substrate then is formed into a thin plate structure comprising a first face, a second face, and a plurality of flow distribution channels on at least one of the faces.

Optionally, the method may further comprise a thermal treatment of the substrate to reduce or eliminate phases such as carbide and nitride precipitates that may adversely affect ductility of the substrate. Preferably, the thermal treatment may comprise a solution anneal. In another option, the method may further comprise depositing onto the substrate a conductive coating of a material selected from the group consisting of gold, gold alloys, platinum, platinum alloys, iridium, iridium alloys, ruthenium, ruthenium alloys, and mixtures of any of these. The conductive layer ensures sufficiently low electrical contact resistance and counteracts the effects of passive layers that may form on the substrate.

Optionally, the method may comprise providing a substrate that further comprises an economical material such as an austenitic stainless steel, a ferritic stainless steel, a carbon steel, or aluminum. The manganese-stabilized austenitic stainless steel on such a substrate may be present as a thin layer. The method may further comprise depositing onto the thin layer of manganese-stabilized austenitic stainless steel a conductive coating of a material selected from the group consisting of gold, gold alloys, platinum, platinum alloys, iridium, iridium alloys, ruthenium, and ruthenium alloys.

Figure 1:
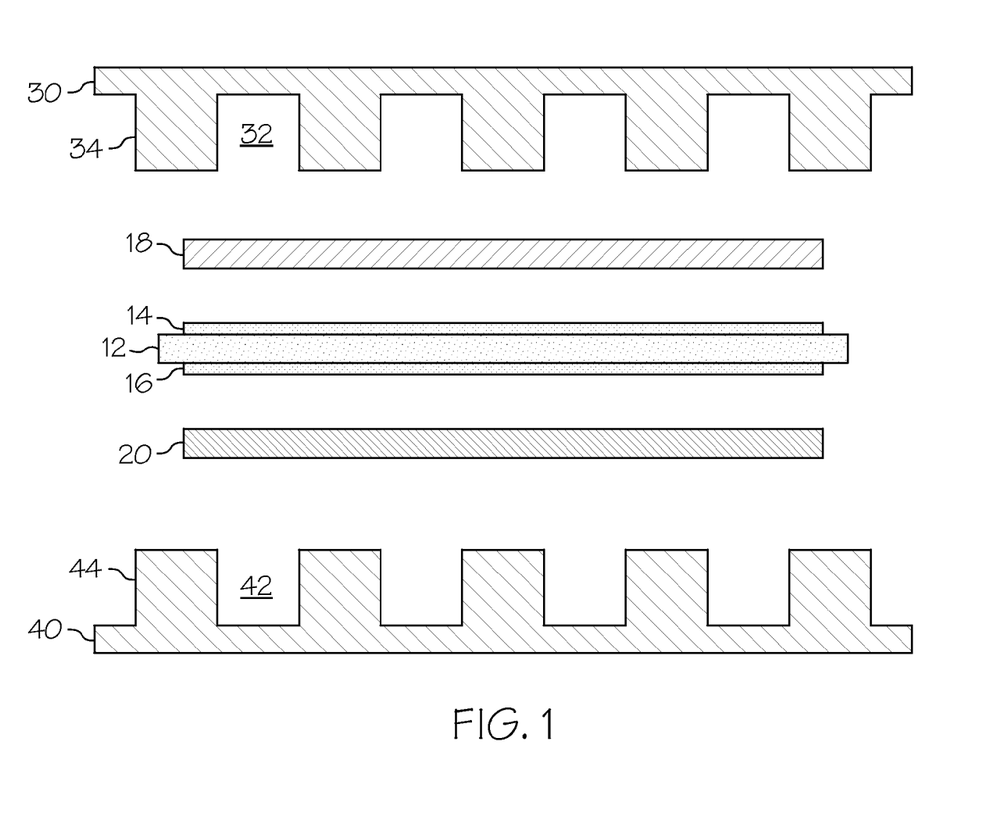
FIG. 1 is a partial, perspective view of a fuel cell stack according to one or more embodiments of the present invention.

Referring to FIG. 1, in a fuel cell system according to one embodiment of the present invention, the system may comprise a proton exchange membrane 12 having a first face and a second face; a cathode catalyst layer 16 overlying the first face of the proton exchange membrane 12; a cathode diffusion layer 20 coupled to the cathode catalyst layer 16; a cathode bipolar plate 40 overlying the cathode diffusion layer 20; an anode catalyst layer 14 overlying the second face of the proton exchange membrane 12; an anode diffusion layer 18 coupled to the anode catalyst layer 14; and an anode bipolar plate 30 overlying the anode diffusion layer 18. The cathode bipolar plate 40 may define at least one first flowpath 42 for at least one first reactant. The anode bipolar plate 30 may define at least one second flowpath 32 for at least one second reactant. The bipolar plates 30, 40 may comprise a manganese-stabilized austenitic stainless steel according to at least one embodiment of the present invention.

The fuel cell system may comprise further a vertical stack comprising a plurality of the arrangements depicted in FIG. 1, such that the cathode bipolar plate 40 may function as a cathode for one fuel cell and as an anode for an adjacent fuel cell. Similarly, the anode bipolar plate 30 may function as an anode for one fuel cell and as a cathode for an adjacent fuel cell.

Figure 2:
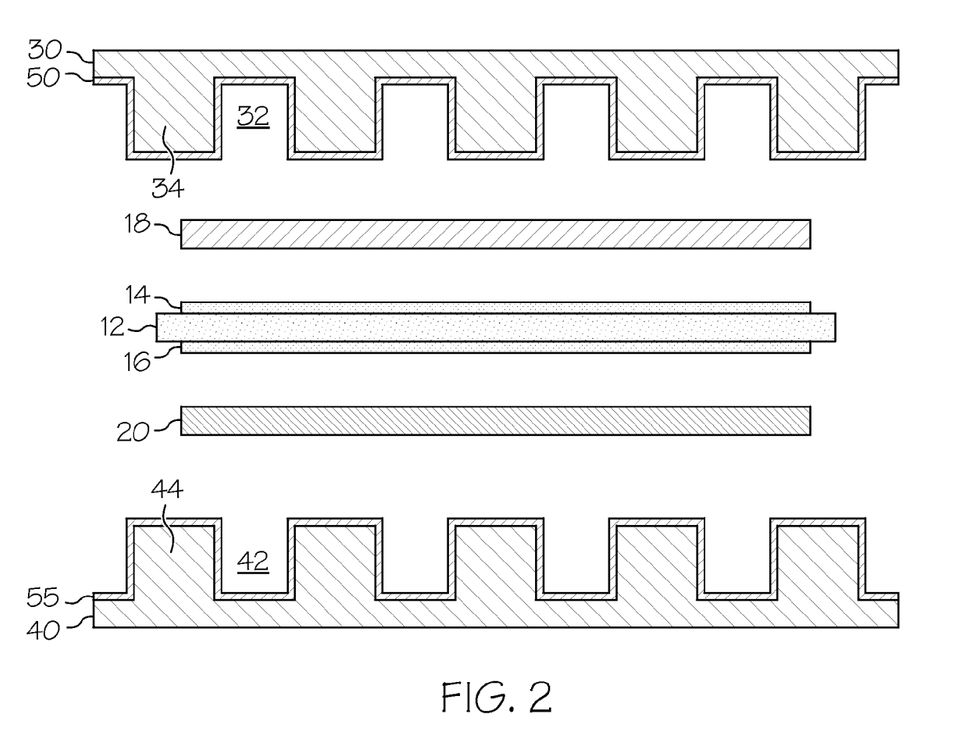
FIG. 2 is a partial, perspective view of a fuel cell stack according to one or more embodiments of the present invention, wherein the bipolar plates are coated with a layer of highly electrically conductive material.

Referring to FIG. 2, a fuel cell system according to another embodiment of the present invention is distinguished from the system depicted in FIG. 1 in that the anode bipolar plate 30 is optionally coated with a first layer of conductive material 50 and the cathode bipolar plate 40 is optionally coated with a second layer of a conductive material 55 that may be the same or different from the first layer of conductive material 50. Conductive layers 50, 55 may comprise materials selected from the group consisting of gold, gold alloys, platinum, platinum alloys, iridium, iridium alloys, ruthenium, ruthenium alloys, and mixtures of any of these. The conductive coatings 50, 55 may increase corrosion resistance of the fuel cell system and may decrease the electrical contact resistance between the anode bipolar plate 30 and the anode diffusion layer 18, the cathode bipolar plate 40 and the cathode diffusion layer 20, or both.

The fuel cell system may comprise further a vertical stack comprising a plurality of the arrangements depicted in FIG. 2, such that the cathode bipolar plate 40 may function as a cathode for one fuel cell and as an anode for an adjacent fuel cell. Similarly, the anode bipolar plate 30 may function as an anode for one fuel cell and as a cathode for an adjacent fuel cell.

Figure 3:
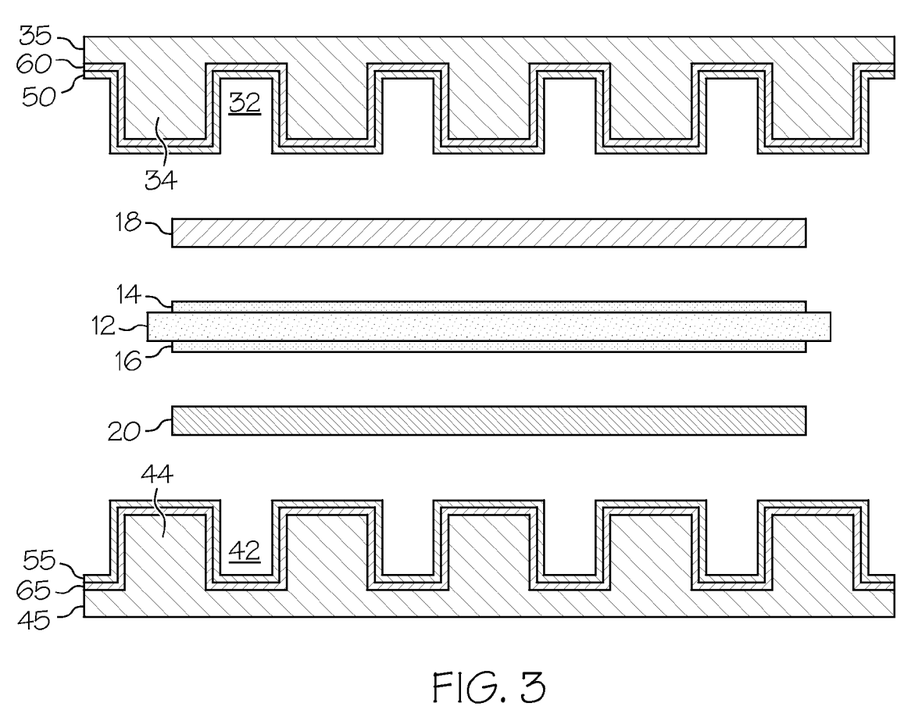
FIG. 3 is a partial, perspective view of a fuel cell stack according to one or more embodiments of the present invention, wherein the bipolar plates comprise an economical

Referring to FIG. 3, a fuel cell system according to another embodiment of the present invention comprises bipolar plates 35, 45, either or both of which may be formed from a substrate of economical material that may comprise, for example, a lower grade austenitic stainless steel, a ferritic stainless steel, a carbon steel, or aluminum. Anode bipolar plate 35 may be coated with thin layer 60 comprising a manganese-stabilized austenitic stainless steel according to at least one embodiment of the present invention. Cathode bipolar plate 45 may be coated with thin layer 65 comprising a manganese-stabilized austenitic stainless steel according to at least one embodiment of the present invention. Optionally, the thin layer 60 of manganese-stabilized austenitic stainless steel on the anode bipolar plate 35 may further be coated with a layer of conductive material 50. Optionally, the thin layer 65 of manganese-stabilized austenitic stainless steel on the cathode bipolar plate 45 may further be coated with a layer of conductive material 55.

The fuel cell system may comprise further a vertical stack comprising a plurality of the arrangements depicted in FIG. 3, such that the cathode bipolar plate 45 may function as a cathode for one fuel cell and as an anode for an adjacent fuel cell. Similarly, the anode bipolar plate 35 may function as an anode for one fuel cell and as a cathode for an adjacent fuel cell.

EXAMPLES

Sample ingots of manganese-stabilized austenitic stainless steels were made in a cast iron book mold of 50 kg steel capacity fed by an air-melt induction furnace pot. The melting points of the alloys initially were estimated based on composition, but superheats of 50-150° C. were added for pouring. Furnace charges consisted of pure iron and steel scrap, FeCr, and FeNi. Nitrogen was added as nitrided FeCr. Samples (pins) were taken from the melt for chemical analysis. If the pin samples contained porosity, aluminum was added to the melts to kill the steels. The compositions of the castings are shown in TABLE 1.

TABLE 1

Compositions of the manganese-stabilized austenitic stainless steels.

| Sample | Melting Point (° C.) | Composition, wt. % | | | | | | | | | |
|---|---|---|---|---|---|---|---|---|---|---|---|
| | | C | Cr | Ni | Mn | Si | Al | N | S | P | Fe |
| GM1 | 1470 | 0.046 | 18 | 1 | 9 | 0.6 | 0.047 | 0.27 | 0.0050 | 0.013 | bal. |
| GM2 | 1450 | 0.060 | 18 | 1 | 15 | 0.6 | 0.060 | 0.35 | 0.0040 | 0.019 | bal. |
| GM3 | 1430 | 0.058 | 18 | 1 | 21 | 0.6 | — | 0.38 | 0.0030 | 0.025 | bal. |

The resulting ingots were cut to 8-10"-long billets in preparation for hot-rolling. The billets were soaked in a reheating furnace at 1200° C. and later hot rolled to 0.27"-thick plates. The plates were air cooled after finish rolling. Coupons of 1"×4"×0.27" were cut from the plates and polished with silicon carbide papers up to 600 grit prior to characterization and corrosion experiments.

X-ray diffraction (XRD) data were collected with a Siemens D5000 diffractometer equipped with a copper x-ray source. The samples were rotated and scanned from 10 to 100 degrees 2-theta in a theta/2-theta geometry. The resultant x-ray diffraction patterns were compared to a reference database for their identification.

Cross sections of the samples were embedded in Lucite™ for optical microscopic observation by hot mounting them at 160° C. The mounted samples were ground and polished to a scratch-free condition. The polished surfaces were cleaned with a soap solution, rinsed with ethanol, and blown dry in hot air. The samples were freshly polished before etching to prevent pre-oxidation of the surface before observation. The etching agent used was aqua regia (3:1 HCl/HNO$_3$ by volume). The samples were etched by immersion for 40-45 seconds at room temperature. The etched specimen surface was flushed immediately with ethanol and blown dry under cool air.

The same samples used for the optical microscopy were examined with under a Scanning Electron Microscope (SEM) to understand the morphology of carbides and other features. The SEM electron beam accelerating voltage was set at 20 kV. A backscattered electron detector was used to image the carbides. The composition of carbides and other features found at the surface of the samples was analyzed using Energy Dispersive x-ray Spectroscopy (EDS).

Tensile coupons were fabricated from each of the three alloys in accordance with ASTM Sub-size tensile specimen specifications. The coupons were 101.6 mm in overall length with a 9.52 mm gripper width. The gage length was 25.4 mm, and the gage center had a width of 6.3 mm.

The samples were given a final polish using 600 grit silicon carbide papers and then washed with ethanol and then deionized water before the corrosion experiments.

The corrosion experiments were carried out using a three electrode cell and a Gamry potentiostat. Potentiodynamic polarization tests were conducted on the samples in de-aerated solutions (0.1 ppm HF, pH=3 at 80° C.) at a scan rate of 0.1 mV/s. The potential was scanned on the sample from −0.4 V to +0.6 V (Ag/AgCl). This potential domain simulates the potential conditions the bipolar plate encounters inside the PEMFC on the anode and cathode sides respectively. A second set of potentiostatic polarization tests was conducted on the samples in aerated 0.1 ppm HF, pH=3 at 80° C. and +0.6 V (Ag/AgCl). The second set simulates the conditions on the cathode side of the fuel cell, and the measured current corresponds to the passive growth on the stainless steel surface.

As a result of the passive film growth, the electrical contact resistance on the sample increases. The contact resistance can be measured by first sandwiching the stainless steel sample between two gas diffusion media layers and placing the sample between two gold-coated copper plates. Then, a constant current is applied to the sample to attain a current density of 1 A/cm$^2$. The voltage drop through the sample is measured at different pressures. These values are compared to values obtained from cathodically cleaned samples that were not subjected to the cathode-side experiments and were known to have minimal contact resistance with the gas diffusion medium.

The results of the X-ray diffraction analyses show that all the Mn-rich alloys were found to possess Mn$_{0.5}$Fe$_{0.5}$, MnFe$_2$O$_4$ and Fe$_{0.8434}$Ni$_{0.1566}$. The Mn$_{0.5}$Fe$_{0.5}$ and MnFe$_2$O$_4$ are body-centered cubic structures, and Fe$_{0.8434}$Ni$_{0.1566}$ is face-centered. The results correspond to typical austenitic stainless steel microstructures. In addition, the carbon content in the alloys is between the limits generally associated with the austenitic steels (<0.15%), as shown in TABLE 1.

The microstructures of all three alloys showed austenite grain boundaries and dark particles of carbides and/or intermetallic particles. The particles were observed intra-granularly in alloys with 9% and 15% Mn, and also in the grain boundaries of the 21% Mn alloy. Solution annealing dissolved most of the carbides observed in the alloys and yield a strain-free and carbide-free austenitic microstructure with a single grain size distribution and equiaxed grains containing annealing twins.

Detailed SEM analysis revealed different types of precipitates in the alloys. Metal-carbide particles of the stoichiometry M$_{23}$C$_6$ (M=Fe, Mn, or Cr) were observed in the three cast alloys. This is the most commonly observed type of carbide in austenitic stainless steels, and its appearance often varies with the precipitation temperature and time. Several intermetallics and oxide phases were also observed, among which the most common were complex oxides of (Fe, Si) and (Fe, Si, Cr, Mn).

The most common form of sulfides observed in austenitic stainless steel grades is MnS. However, no MnS was observed in the three cast alloys most likely due to their low sulfur level.

Mechanical tests were performed on each of the samples. TABLE 2 lists the percent elongation obtained for the cast Mn alloys, which was a maximum of 30.4% for the alloy with 21% Mn. The current bipolar plate designs require values higher than 40%. This criterion is met with 304L, 316L, and 201L stainless steels. The 201L stainless steel is a Mn alloy that has a percentage elongation of >50%. It is possible that the lower values measured on the cast alloys studied in this work were affected by intergranular and transgranular carbide precipitation in addition to the presence of alpha ferrite observed in some of the microstructures. However, solution annealing of the alloys restored ductility and produced a strain-free and carbide-free microstructure with higher elongation and improved mechanical properties.

TABLE 2

Results of mechanical tests performed on the manganese-rich cast alloys.

| Sample | Modulus (MPa) | Load (N) | Tensile Strength (MPa) | Elongation (%) |
|---|---|---|---|---|
| GM1 | 18561 | 37556 | 382 | 24.0 |
| GM2 | 34749 | 42071 | 1050 | 17.7 |
| GM3 | 13663 | 44769 | 1061 | 30.4 |

The alloy samples then were evaluated with respect to corrosion resistance. X-ray photoelectron spectra were obtained from the polished and cleaned Mn stainless steel alloys to assess passive film thickness. The passive film thickness was measured based on the sputtering rate of $Ta_2O_5$. The passive film was found to be 3 nm for alloy GM1, 4 nm for alloy GM2, and 5 nm for alloy GM3. Manganese was found to exist in the passive films of each of the three alloys. The findings were consistent with an increase of passive film thickness with increase in the manganese content of the alloys.

Potentiodynamic polarization curves were obtained on the different manganese alloys in de-aerated test solutions. Under the current experimental conditions, it was found that manganese has a beneficial effect on enhancing the corrosion resistance of the stainless steel at lower potentials. A significant decrease in the anodic current was seen with the alloy that has 21 wt. % manganese. Furthermore, the 21 wt. % alloy has lower dissolution current at lower "active" potentials than 304L stainless steel. Accordingly, the currently tested Mn alloys are expected to survive the anode side conditions in PEM fuel cells, based on existing data obtained for 304L stainless steel under real fuel cell conditions in single cells and fuel cell stacks.

To understand the behavior of the Mn stainless steel samples under the cathode side conditions, several experiments were carried out to: (1) measure the steady state passive currents on the different alloys, (2) build the passive oxide films on the surfaces of the alloys, and (3) to measure the contact resistance on the samples after the passive oxide films are fully grown on the samples.

Steady state passive currents were measured on the samples. A comparison was made between the values measured on the manganese alloys versus those measured on 304L stainless steel under otherwise identical experimental conditions. The passive currents measured on the three manganese alloys were very similar. Values on the order of 20-40 $nA/cm^2$ were measured on the alloys, which are not that much lower than those measured on 304L stainless steel.

Fuel cell data obtained on 304L stainless steel show that it survives the fuel cell environment on the cathode side of the fuel cells without any signs of corrosion or rust when used with low-fluoride-release membranes. Thus, it can be assumed that the current manganese alloys will most likely survive the cathode side conditions to the same extent as the 304L stainless steel survives under real fuel cell conditions.

The contact resistance on the three alloys was measured before and after the cathode-side experiments to monitor the change in contact resistance after the growth of the passive film on the surfaces of the alloys. TABLE 3 shows that for each alloy the contact resistance has significantly increased after the cathode side experiment and that the increase is proportional to the manganese content of the alloy. These results indicate that the alloys required a conductive coating to allow for their use in the fuel cell environment and to avoid excessive contact resistance during fuel cell stack operation or shutdown.

TABLE 3

Values of contact resistance obtained on the manganese-rich cast alloys and 304L stainless steel after cathode-size experiments.

| | Contact Resistance ($m\Omega \cdot cm^2$ at 200 psi) | |
|---|---|---|
| Sample | Before Test | After Tests |
| GM1 | 6.8 | 160 |
| GM2 | 7.5 | 219 |
| GM3 | 7.4 | 350 |
| Comparative: 304L SS | 7.5-9 | 150 |

It is noted that terms like "preferably," "commonly," and "typically" are not utilized herein to limit the scope of the claimed invention or to imply that certain features are critical, essential, or even important to the structure or function of the claimed invention. Rather, these terms are intended merely to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A bipolar plate comprising:
   a cathode face defining at least one first flow distribution channel for at least one first reactant; and
   an anode face defining at least one second flow distribution channel for at least one second reactant, wherein at least one of the cathode face and the anode face comprises a manganese-stabilized austenitic stainless steel consisting of:
   from 19% to 23% by weight manganese;
   from 0.5% to 1.5% by weight nickel;
   from 17% to 20% by weight chromium;
   from 0.2% to 0.5% by weight nitrogen;
   up to 0.075% by weight carbon;
   from 0.5% to 1.0% by weight silicon;
   up to 0.1% by weight aluminum;
   from 0% to 0.005% by weight sulfur; and
   balance iron and incidental impurities.

2. The bipolar plate of claim 1, further comprising a layer of electrically conductive material disposed on the manganese-stabilized austenitic stainless steel.

3. The bipolar plate of claim 2, wherein the electrically conductive material is selected from the group consisting of gold, gold alloys, platinum, platinum alloys, iridium, iridium alloys, ruthenium, ruthenium alloys, rhodium, rhodium alloys, and mixtures of any of these.

* * * * *